Patented Oct. 20, 1931

1,828,376

UNITED STATES PATENT OFFICE

MARTIN MÜLLER-CUNRADI, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

MANUFACTURE OF IRON CARBONYL

No Drawing. Application filed August 10, 1925, Serial No. 49,452, and in Germany August 11, 1924.

The known experiments for preparing iron carbonyl have been made with finely divided iron prepared from precipitated iron oxid or other finely divided iron oxid.

The use of such material for a large scale production of iron carbonyl would be very unpleasant, and I have found that it is not necessary to start from iron in the form of fine powder. In accordance with my invention, iron carbonyl is prepared with great practical advantages from iron in the form of porous lumps. Such porous iron may be obtained for example by reducing roasted pyrites or other lumps of iron oxid which reduction is preferably carried out at a moderately high temperature. For the production of iron carbonyl, carbon monoxid is passed over such porous iron lumps at an elevated temperature and pressure and preferably either in a continuous way by employing so rapid a gas current that the iron carbonyl formed is carried away with it and deposited in a separate receiver, or the conditions may be such as to allow the iron carbonyl to accumulate in the iron mass from which it must be removed from time to time in any suitable way for example by distilling off at an increased or at ordinary pressure or in vacuo, whereupon the reaction may be started again. The employment of iron in porous lumps has of course the important advantage of allowing the gases a free passage in contradistinction to powdery iron masses.

The following example will serve to further explain one mode of carrying the invention into practice to which example however the invention is not restricted.

An autoclave lined with copper is filled with roasted pyrites which had been before reduced at 500 degrees centigrade by means of hydrogen. The autoclave is then heated to a temperature of between 90 degrees and 100 degrees centigrade and carbon monoxid forced in for several hours at a pressure of between 50 and 120 atmospheres. As long as the pressure drops, fresh gas is forced in. After a while, the pressure remains practically constant which means that carbon monoxid is no longer taken up by the iron mass. The pressure is then released and the iron carbonyl which has accumulated in the reaction vessel in a liquid form is distilled off by raising the temperature. The expansion valve is then again closed and carbon monoxid forced in anew. By repeatedly alternating the said operation, the iron contents of the starting material can be practically completely transformed into iron carbonyl.

I claim:

1. The process of manufacturing iron carbonyl which comprises causing carbon monoxid to react at a temperature between about 50 degrees and 250 degrees centigrade and at an increased pressure on iron in the form of porous lumps while taking care that the iron carbonyl formed is removed from the iron in the course of the process.

2. The process of manufacturing iron carbonyl which comprises causing carbon monoxid to react at a temperature between about 50 degrees and 250 degrees centigrade and at an increased pressure on iron in the form of porous lumps, distilling off the iron carbonyl which has accumulated in the iron mass, at a low pressure and repeating the said operation.

In testimony whereof I have hereunto set my hand.

MARTIN MÜLLER-CUNRADI.